United States Patent [19]
Rovira Badia et al.

[11] Patent Number: 5,301,635
[45] Date of Patent: Apr. 12, 1994

[54] VALVE FOR DRINKERS AND AUTOMATIC DRINKER PROVIDED THEREWITH

[75] Inventors: Antonio Rovira Badia; Jose Franco Tarazaga, both of Vilafranca del Penedés, Spain

[73] Assignee: Tecnica E Innovaciones Ganaderas, S.A. (TIGSA), Barcelona, Spain

[21] Appl. No.: 866,056

[22] Filed: Apr. 10, 1992

[30] Foreign Application Priority Data

| Apr. 12, 1991 | [ES] | Spain | P9100934 |
| Apr. 12, 1991 | [ES] | Spain | P9100935 |
| Mar. 27, 1992 | [ES] | Spain | P9200660 |

[51] Int. Cl.$^5$ .............................................. A01K 39/02
[52] U.S. Cl. ...................................... 119/72.5; 119/81; 251/332
[58] Field of Search ............... 119/72.5, 81; 251/332, 251/339; 137/408

[56] References Cited

U.S. PATENT DOCUMENTS

| 3,283,746 | 11/1966 | Rüter | 137/408 X |
| 3,398,927 | 8/1968 | Rüter | 119/81 X |
| 4,196,699 | 4/1980 | Leeming | 119/81 |
| 4,228,821 | 10/1980 | Stark | 137/533.11 |
| 4,254,724 | 6/1985 | Steudler, Jr. | 119/72.5 |
| 4,606,301 | 8/1986 | Steudler, Jr. | 119/72.5 |
| 4,637,345 | 1/1987 | Hostetler | 119/72.5 |
| 4,779,571 | 10/1988 | Row | 119/75 |

FOREIGN PATENT DOCUMENTS

2200726 8/1988 United Kingdom .

OTHER PUBLICATIONS

S. J. M. Verdoodt, Examiner, European Search Report, Dec. 8, 1992.

*Primary Examiner*—Robert P. Swiatek
*Attorney, Agent, or Firm*—Cushman, Darby & Cushman

[57] ABSTRACT

A valve having a metal washer (5) slightly extending from the periphery of the passage of the narrowing (2) of the valve body member (1) avoiding friction of the push member (11) in said narrowing; and the formation, in the upper gasket (12) of a concave bevel (13) where the ball (14) engages, forming a contact area which increases the watertightness of the gasket. It is a feature of the drinker that the bowl (35) and the stem (36) are integral, the stem having a cruciform section reinforcing it and facilitating the fall of the water through the lower port (47) of a threaded bushing (40) screwed on a lower tubular extension (43) of the body member (1') of the valving device (1') on which extension there is also threaded a locknut (45) ensuring the position of the threaded bushing (40). A version having a single rigid gasket (8') with elimination of the washer (5) is contemplated.

4 Claims, 3 Drawing Sheets

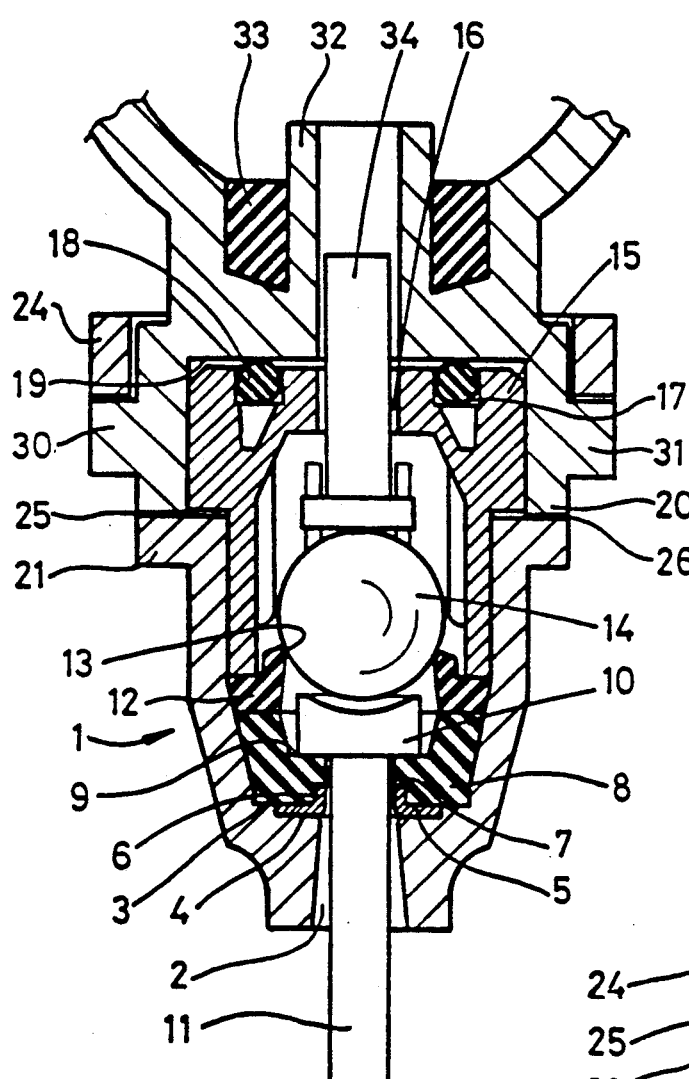
Fig. 1
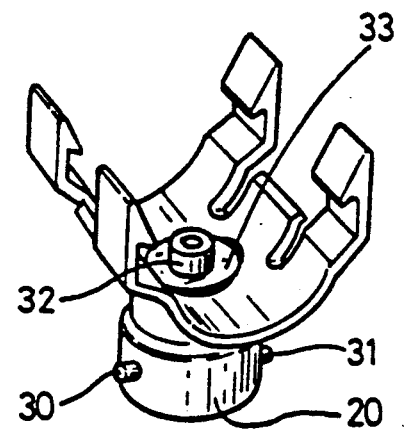
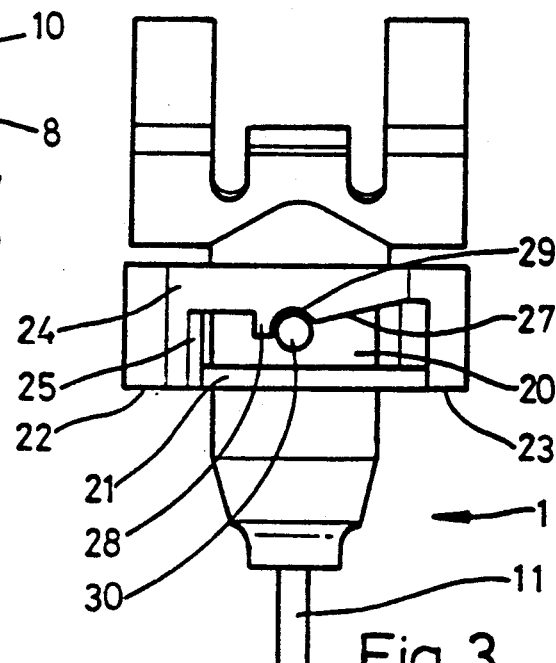
Fig. 2
Fig. 3

VALVE FOR DRINKERS AND AUTOMATIC DRINKER PROVIDED THEREWITH

The invention relates to a valve for drinkers and to an automatic drinker provided therewith.

The valve is mainly for drinkers for domestic fowl such as cocks, hens and chicks and is of the type formed by a tubular body member having an upper, also tubular, cover and which is connected to a horizontal water supply line. From the bottom of the body member there extends a metal push member which, when pushed sideways and/or upwards by the bird's beak, opens the valve to allow water to drip out.

The said push member is formed at the top thereof with a head seating on a lower annular gasket provided in the shoulder formed by the lower narrowing of the said body member, in the interior of which there is another upper annular gasket in which there is housed a ball which is moved upwardly by the head of said stem when this is actuated by the bird.

This class of known valves has the drawback of the, wear of the narrowed portion of the body member and lower annular gasket because of the friction of the push member operated by the bird and the coupling to the water supply line is complex and, in certain cases, unbalanced, with imperfect sealing.

One of the objectives of the invention is to provide a valve which is easy to manufacture and assemble, which is cheap and which, at the same time, achieves a perfect sealed coupling both with regard to the valve system thereof and to the coupling system thereof to the water supply line, said valve being constituted, furthermore, to have a long service life.

To this end, a washer having an upwardly folded inner edge has been arranged in the narrowing of the valve body member. The operating push member of the valve rubs against this upwardly folded inner edge, so that the push member is prevented from rubbing against (1) the narrowing of the body member made from plastics material and (2) a recessed lower portion of the lower annular gasket into which the washer folds.

This washer is held in position by being housed in a recess formed in the inner shoulder of said body member, which is formed in the narrowing, and is fitted by the upturned edge in a peripheral recess of the inner edge of the lower gasket.

A further feature is the fact that the upper gasket is provided with a concave bevel on the upper inner edge thereof, mating with the curve of the sealing ball, the contact area of which aids in a tight seal.

Yet a further feature of the valve is determined by the fact that the cover is provided at the top thereof with a throat in which there is mounted a gasket making a perfect tight seal when engaging the connecting bushing of the valve to the water supply line.

With regard to the system for attaching the valve to said line, it is easily effected by a bayonet type press fit for which purpose the valve body member is provided on the upper edge thereof with a flange having diametrally opposite expansions and from which there extends upwardly a peripheral wall which is provided on opposite sides thereof with respective apertures having a sloping upper edge and a neb or lug, with which there are engaged diametrally opposite bosses on the connection bushing to the water supply line after they have been inserted through the said apertures, and said bosses are retained in respective slots provided adjacent said nebs or lugs.

The drinker provided with the said valve is for poultry farms where the fowl are bred and reared for meat and/or egg laying.

Several types of automatic valving devices are already known and among them there are the so-called bowl type which comprise a water receiving bowl from which the fowl drink. This bowl is fixedly attached to an upper axial stem which engages a valve connected to the water supply line. A spring is mounted around the stem and when the water level and weight drop, it extends and pushes the stem upwards to open the valve and allow the water to flow by gravity.

It is an objective of the invention to provide for easy regulation of the desired water level in the bowl, with means assuring such regulation, all with the lowest possible number of parts to cheapen the cost price of the drinker and at the same time eliminate faults, providing for a long service life.

It is, therefore, a feature of the invention that the stem is integrally formed with the bowl and that the valving device body member is extended tubularly at the lower end thereof, with the outer periphery thereof having a screw thread to receive a threaded bushing on the bottom of which there will bear the lower end of the spring, the upper end of which bears against the washer with a cut-away portion fitted in a throat provided in the upper portion of the stem.

It is also a feature that a lock nut is fitted on the threaded portion of the tubular extension of the valve to lock the desired position of the threaded bushing on said extension and that the stem is provided with a cruciform section reinforcing it and facilitating the flow of the water towards the bowl.

This valve system works well for supplying water to the birds, nevertheless in certain cases it is desirable to add medicinal, vitamin or other products to the water to treat diseases that the birds may be suffering from or to obtain certain effects in the birds. In many cases, these products attack the resilient material forming the gaskets, which become deformed and result in an irregular seating for the head of the push member stem and for the ball, causing water leaks which flood the birdspace, with the corresponding harm.

To overcome this problem, it has been contemplated to replace the the two resilient gaskets with a single unattackable rigid material such as stainless steel, glass of another, which is undeformable, said gasket being provided on the inner edge thereof with a peripheral shoulder forming two slightly bevelled edges providing a double seat for the ball.

The two bevels of the gasket are inclined at a different angle, each corresponding to the plane of the bevel perpendicular to the radius of the ball coinciding with the respective bevel.

This rigid gasket solution also allows the washer provided in the bottom of the valve body member, having the purpose of avoiding the friction of the push member with the lower narrowing of the valve body member through which the water falls, to be eliminated.

These and other features will be better understood from the following detailed description, to facilitate which there are attached to the description three sheets of drawings in which certain embodiments given only as a non-limiting example of the scope of the invention are shown.

In the drawings:

FIG. 1 is an elevation view in cross section of the whole of the valve fitted to the connection bushing to the water supply line;

FIG. 2 is an exploded perspective view of the valve and the connection bushing;

FIG. 3 is an elevation view of the valve and bushing coupled together;

Figure 4:
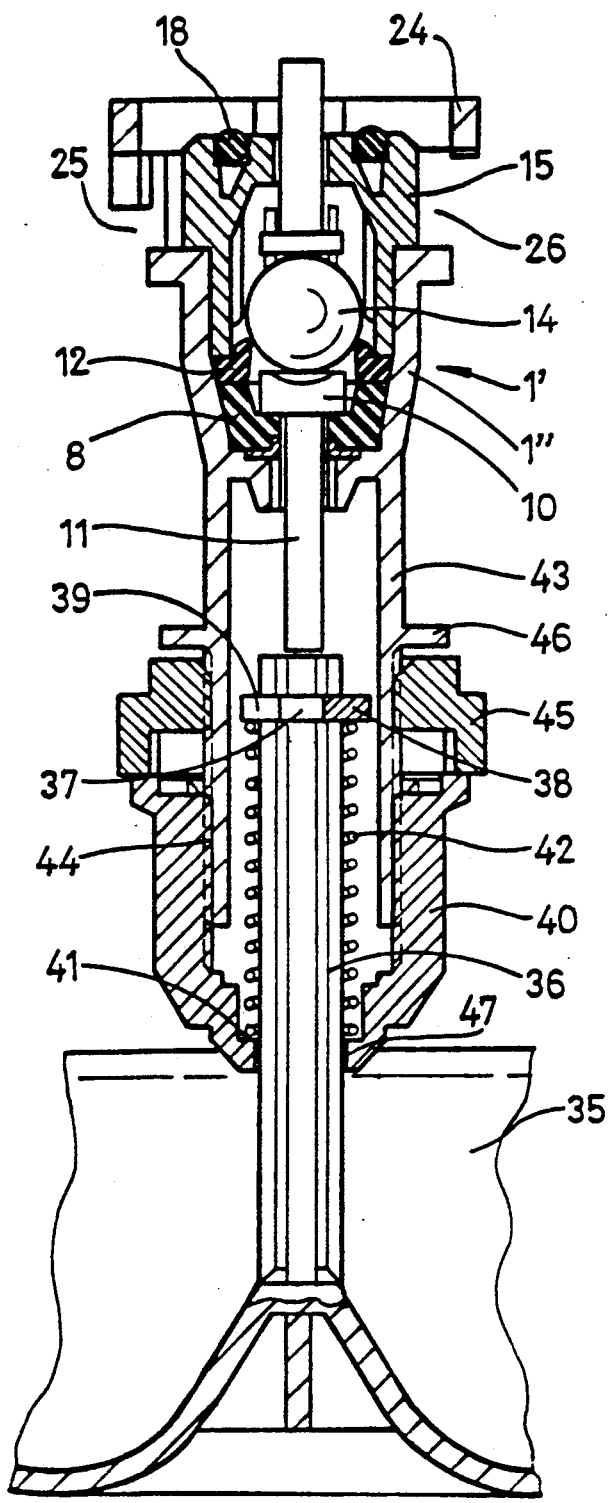
FIG. 4 is an elevation view in cross-section of the whole of the drinker.
Figure 5:
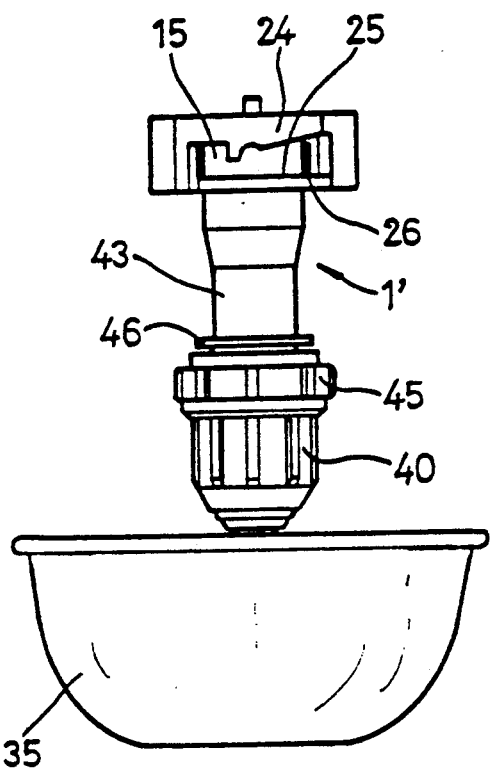
FIG. 5 is an elevation view thereof.
Figure 6:
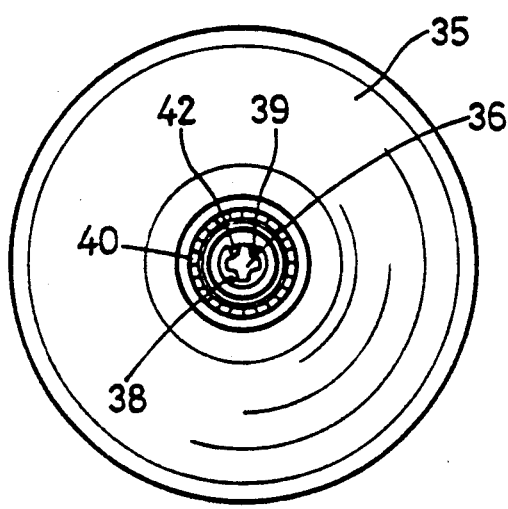
FIG. 6 is a plan view of the stem attached to the bowl and the threaded bushing mounted thereon.

As shown in the drawings, the valve comprises a tubular body member 1 of plastics material, formed at the bottom with a frustoconical narrowing 2 which forms internally a shoulder 3 provided with a circular recess 4 beside said narrowing and in which there fits a metal washer 5 having an inner edge forming an upwardly directed fold 6 which engages in a peripheral recess 7 of the inner edge of a lower resilient gasket 8 seated on the shoulder 3.

The gasket is formed at the top thereof with a circular shoulder 9 in the inner edge thereof, where the cylindrical head 10 of a metal push member 11 extending from the lower port of the narrowing 2 of the valve body forms a seal.

On this gasket there is arranged adjacently another annular gasket 12 preferably of greater resilience which is provided on the upper inner edge thereof with a concave bevel 13 having the same curvature as the metal sealing ball 14 which rests on said bevel.

In the body member 1 there is snugly fitted a tubular cover 15 provided at the top thereof with a narrow passage 16 and therearound an external throat 17 in which there is arranged an O-ring seal 18 to bear against the inside bottom 19 of a bushing 20 having connection means to the water supply line.

To connect the valve to said bushing 20 the body member 1 thereof is provided on the upper edge thereof with a flange 21 having at diametrally opposite locations respective expansions 22 and 23 and which extends upwardly forming a peripheral wall 24 in which apertures 25 and 26 have been provided in opposite locations, the upper edge 27 of which is inclined and is provided with a lug 28 and therealongside a slit 29 (FIG. 3).

The coupling of the valve to the connection bushing 20 to the water supply line is effected by bayonet coupling of the apertures 25 and 26 to respective bosses 30 and 31 provided diametrally opposite on the bushing 20 and by rotating the valve the coupling is effected by lodging said bosses in the slits 29.

The bushing 20 is formed at the top end thereof with a tubular appendix 32 for penetrating in an orifice of the water supply line, about which appendix there is provided a gasket 33 for adequate watertightness of the connection to said line.

The way of coupling the bushing to the water supply line may be any of the conventionally used ones. In the embodiment shown, the bushing is extended forming semiresilient arms terminating in a harpoon tooth for a clip type coupling.

Reference symbol 34 is a weighting member resting on the ball 14 to ensure better sealing against the gasket 12.

The operation of the valve is very simple: when the bird pecks the push member 11, moving it either upwards and/or to one side, the head 10 of said stem separates from the lower gasket 8 and at the same time will displace the ball 14 from the upper gasket 12, whereby water will drip into the narrowing 2.

When operation of the push member 11 ceases, the ball 14 and the head 10 will seat by gravity on their gaskets, which double sealing ensures perfect watertightness.

The drinker comprises a bowl 35 of plastics material from which there integrally extends an upper stem 36 of cruciform section having close to the upper end thereof a throat 37 around which a washer 38 having a cutaway portion 39 is mounted.

The stem 36 is mounted in a threaded bushing 40 forming a bottom 41 on which the lower end of a coil spring 42 mounted around the stem bears and which engages at the upper end thereof the said washer 38, said threaded bushing being screwed on a lower tubular extension 43 of the valve device 1' provided to this end with the threaded end portion 44.

A locknut 45 engages said threaded portion and may be screwed thereon until limited by an upper stop member formed by a flange 46 of the extension 43 of the valving device.

The body member 1" of this device is extended upwardly as a diametral expansion forming the wall 24 with the two opposite apertures 25 and 26 for bayonet coupling to the bushing connected to the water supply line.

The drinker operates as follows:

Once the tension of the spring 42 has been adjusted by screwing the threaded bushing 40 on the extension 43 of the valving device and locking it in that position by the locknut 45 engaging the threaded bushing, the bowl 35 will have been adjusted to give a preset water level.

When the birds drink from the bowl, the water level drops and, therefore, the weight thereof also, causing recovery of the spring 42 which pushes the stem 36 upwards and this in turn pushes the metal push member 11, whereby the head 10 thereof moves away from the gasket 8 and in turn moves the ball 14 away from the gasket 12 therefor, allowing the water to flow through by gravity in the space formed between the lower port 47 of the threaded bushing and the cruciform stem.

Figure 7:
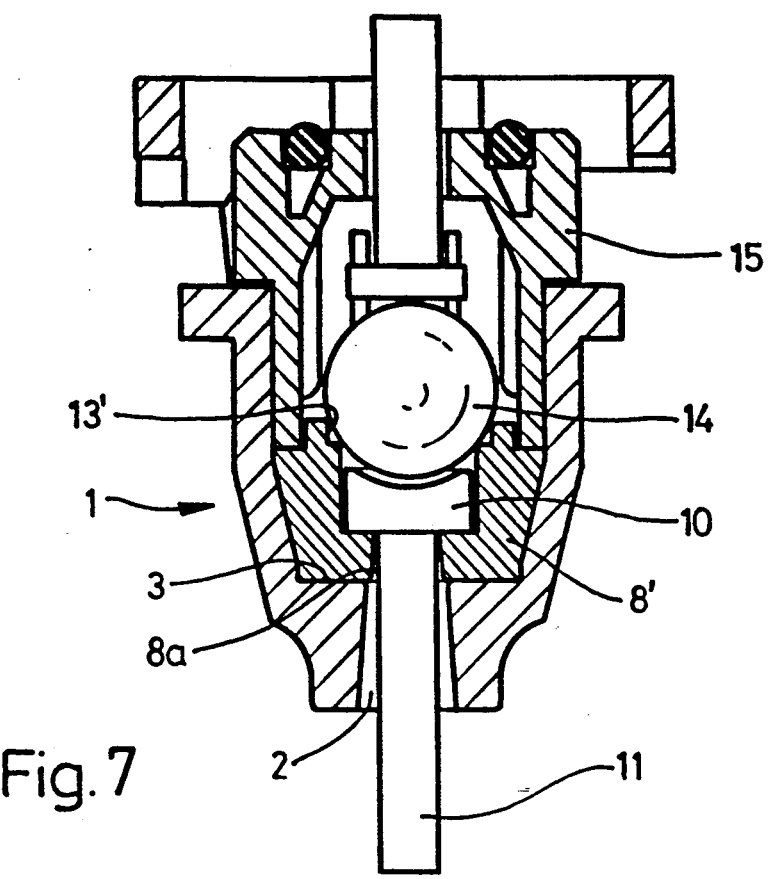
FIG. 7 is an elevation view in cross section of the whole of the valve with a single rigid gasket.
Figure 8:
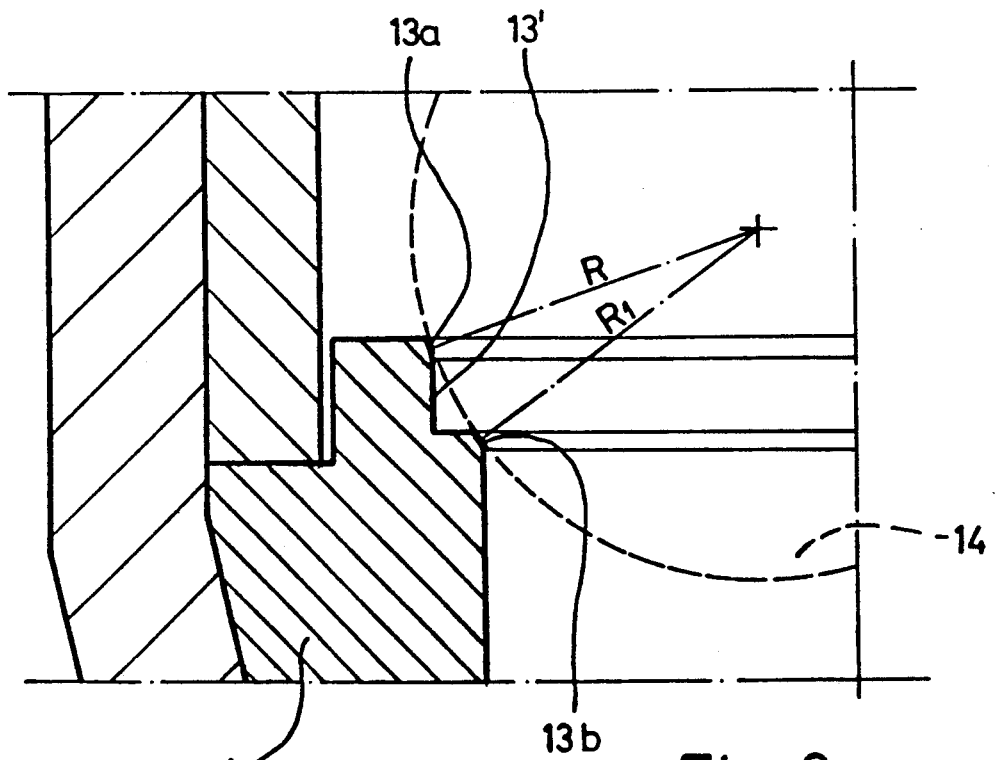
FIG. 8 is a detail view on a larger scale of the bevelled edges of the gasket.

As is to be seen in FIG. 7, the tubular body member 1 of the valve is provided with a completely flat inner shoulder 3 where a rigid gasket 8' is seated. On the top side thereof, the latter is formed on the inner upper edge with a shoulder 13' forming two slightly bevelled edges 13a and 13b on which the ball 14 seats along two mutually parallel peripheral regions, said two bevels, having a width of 0.1 to 0.2 mm, have the planes thereof sloping differently determined by the perpendicularity thereof with regard to the radii R and R of the ball coinciding with the respective bevels.

The gasket 8' is provided with a slightly tapering lower orifice 8a, coinciding with the narrowing 2 of the body member 1, the lower edge thereof being rounded and slightly salient relative to the taper of the narrowing 2 so that the push member does not rub against said narrowing to avoid wear thereof.

The tubular cover 15 when attached to the body member 1 retains the gasket 8' in the working position thereof, obtaining the said double sealing of the ball 14 and the sealing of the head 10 of the push member on the orifice 8a of the gasket.

We claim:

1. A valve for drinkers comprising:
 a body member having a lower narrowing portion, said lower narrowing portion having a lower passage extending therethrough;
 a moveable push member having a head portion within said body and an extending portion extending from said head portion through said lower passage and out of said body;
 a lower annular gasket arranged in said lower narrowing portion to form a seat for said head portion, said head portion normally resting on said lower annular gasket, said lower annular gasket having an inner edge through which said extending portion projects;
 an upper annular gasket disposed above said lower annular gasket;
 a valve member engageable with said upper annular gasket to restrict flow of fluid through said lower passage of said valve, said push member being moveable towards said valve member to disengage said valve member from said upper annular gasket to permit fluid flow through said valve; and
 an annular metallic member having a sleeve, said metallic member disposed between said lower annular gasket and said lower narrowing portion with said sleeve disposed in a peripheral recess in said inner edge of said lower annular gasket for protecting said body and said lower annular gasket.

2. The valve as claimed in claim 1 wherein the upper annular gasket has an upper edge forming a concave bevel for engaging the valve member.

3. The valve as claimed in claim 1 further comprising:
 a cover for said body member, said cover being mounted on said body and having an upper passage therethrough, said upper passage communicable with said lower passage and surrounded by a peripheral channel;
 a bushing providing a connection between the valve and a water supply line; and
 a sealing gasket disposed in said peripheral channel for engagingly sealing said bushing to said cover.

4. The valve as claimed in claim 3 wherein the body member comprises an upper flange having diametrically opposed expansions carrying an upwardly extending peripheral wall, said peripheral wall having opposing apertures each with a surrounding edge, each said surrounding edge comprising an inclined upper edge portion, a lug, and a slit therebetween;
 said bushing having fixed thereto diametrically opposing bosses, said bosses being retained in said slits for operatively coupling the valve to the bushing.

* * * * *